(12) United States Patent
Oba et al.

(10) Patent No.: US 8,203,744 B2
(45) Date of Patent: Jun. 19, 2012

(54) SYSTEM AND METHOD FOR REGISTRATION DEVICE LOCATION

(75) Inventors: Kazutaka Oba, Johns Creek, GA (US); Tomoki Hattori, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 781 days.

(21) Appl. No.: 12/337,302

(22) Filed: Dec. 17, 2008

(65) Prior Publication Data

US 2010/0149585 A1 Jun. 17, 2010

(51) Int. Cl.
*G06K 15/00* (2006.01)
*G06K 9/00* (2006.01)

(52) U.S. Cl. ...................................... 358/1.18; 358/1.15
(58) Field of Classification Search ........................ None
See application file for complete search history.

(56) References Cited

U.S. PATENT DOCUMENTS

| | | | | |
|---|---|---|---|---|
| 5,848,373 A * | 12/1998 | DeLorme et al. | ............. | 701/200 |
| 7,558,855 B2 * | 7/2009 | Valladares et al. | ............ | 709/226 |
| 2001/0052995 A1 * | 12/2001 | Idehara | ........................ | 358/1.15 |
| 2003/0160993 A1 * | 8/2003 | Kang | ........................... | 358/1.15 |
| 2005/0114772 A1 * | 5/2005 | Talley et al. | .................. | 715/541 |
| 2006/0184522 A1 * | 8/2006 | McFarland et al. | ............... | 707/5 |
| 2006/0273177 A1 * | 12/2006 | Lee et al. | ................. | 235/462.01 |
| 2007/0234354 A1 | 10/2007 | Hattori | | |
| 2007/0245358 A1 | 10/2007 | Hattori et al. | | |

OTHER PUBLICATIONS

Ricoh Americas Corporation, Ricoh® Aficio MP 7500 Manual, Jun. 11, 2008, http://www.ricoh-usa.com/downloads/downloads.asp?tsn=Ricoh-USA&path=http://support.ricoh.com/bb_v1oi/html/oi/rc2/model/mp55/mp55en.htm.

* cited by examiner

*Primary Examiner* — Twyler Haskins
*Assistant Examiner* — Lennin Rodriguez
(74) *Attorney, Agent, or Firm* — Oblon, Spivak, McClelland, Maier & Neustadt, L.L.P.

(57) ABSTRACT

A method of connecting an image forming apparatus (IFA) to a network and assigning the IFA a network address, selecting a map file image from a plurality of map file images, the selected map file image corresponding to a regional location of the IFA, outputting the selected map file image, selecting a location on the map file image which corresponds to a physical location of the IFA, and storing the location and the network address. An IFA configured to implement the method.

12 Claims, 9 Drawing Sheets

SYSTEM AND METHOD FOR REGISTRATION DEVICE LOCATION

BACKGROUND OF THE INVENTION

1. Field of the Invention

The present invention relates to registration systems for recording and managing the location of image forming apparatuses, including printers, multifunction printers and copiers.

2. Description of the Related Art

Printing devices and image forming apparatuses, such as printers, laser printers, copiers, multifunction printers and multifunction devices are commonly used in large, networked systems. Some large organizations, including corporations and universities, use as many as tens of thousands of such devices in a networked configuration. Thus, it has become important to track and manage the location of these devices.

Tracking and managing these devices has importance in the areas of inventory control and chain management. Also, it can be important to know the location of and usage of one of these devices in order to most efficiently utilize the device or update the device.

For example, some devices are efficient at printing less than ten thousand pages a month whereas other devices are efficient only when printing more than fifty thousand pages a month. By knowing the location of such devices and the location of maximum usages, companies can most efficiently use these devices by locating them in proper locations.

In order to track location and usage of these image forming apparatuses, it has been known to track usage history via a network connection. Determining the location of the image forming apparatus, however, has not been automatic. Thus, it has been necessary to manually record the location of the image forming apparatus in a database or spreadsheet. However, the entry in the database of the location of the image forming apparatus is limited to a physical location of a network plug the image forming apparatus is connected or a room wherein the image forming apparatus is located.

In a large organization, where there can be tens of thousands of image forming apparatuses connected to a common intranet, maintaining a database for the location of each individual image forming apparatus can become unwieldy and difficult to maintain when registering the location of a new image forming apparatus connected to the network, relocating an existing image forming apparatus, locating an existing image forming apparatus to perform service, or finding an image forming apparatus configured to perform a specific function.

SUMMARY OF THE INVENTION

The invention broadly comprises a method of connecting an image forming apparatus (IFA) to a network and assigning the IFA a network address, selecting a map file image from a plurality of map file images, the selected map file image corresponding to a regional location of the IFA, outputting the selected map file image, selecting a location on the map file image which corresponds to a physical location of the IFA, and storing the location and the network address.

Preferably, the outputting includes printing the selected map file image, and the selecting the location on the map file image includes marking the printed map file image with a mark corresponding to a physical location of the IFA, scanning the marked map file image, and comparing the scanned map file image with the selected map file image to determine a coordinate location of the mark, wherein the coordinate location of the mark is used as the location of the IFA in the storing.

Also preferably, the printing includes printing a computer readable barcode onto the map image file, the barcode corresponding to information including at least one of the network address of the IFA, a function the IFA is configured to perform, and an identification name of the IFA.

The scanning may include reading the barcode and determining the information corresponding to the barcode, and the registering may include recording the information in the database entry and associating the information with the IFA. Here, the barcode preferably includes an instruction and the scanning preferably includes reading the barcode for the instruction and the information corresponding to the barcode. In this embodiment, the registering includes transmitting the location, the network address, and the information to the recording device according to the instruction, recording the information in the database entry, and associating the information with the IFA.

Alternatively, the printing the selected map file image includes printing an overlay of a grid on the selected map file image, the grid having a plurality of marking areas corresponding to a plurality of respective coordinate locations on the map image file, wherein the marking the printed map image file includes marking one of the plurality of marking areas and the coordinate location of the mark is one of the plurality of respective coordinate locations.

In another embodiment, the IFA includes a display. Here, the selecting the map file image includes displaying the plurality of map file images on the display, the outputting the selected map file image outputs the selected map file image to the display, and a selectable input of the display is used in the selecting the location on the map file image.

In yet a further embodiment, a location application of the IFA is accessed using a computer connected to the network, wherein the selecting the map file image, the outputting, and the selecting the location are performed through the location application.

In some aspects, the regional location is at least one of a country, state, city, zip code, address, building, floor and campus. In other aspects, the selecting the location on the map file image uses at least one of a global positioning system, wireless network triangulation, radio frequency identification, and radio frequency triangulation.

In yet further aspects, the storing includes storing the location and the network address in a database of a recording device. Here, the method further includes accessing the recording device through the network, searching the database for a database entry corresponding to the IFA using a search term including at least one of the network address of the IFA, a function the IFA is configured to perform, and an identification name of the IFA, and outputting a search result by creating a new map image file by overlaying the location of the IFA onto the selected map image file and displaying the new map image file.

The invention also broadly comprises IFA, comprising a processor configured to query a map file image of a plurality of map file images, the map file image corresponding to a regional location of the IFA, a printer configured to print the map file image and a computer readable barcode, the barcode configured to include information about the IFA, including at least one of a network address of the IFA, a function the IFA is configured to perform, and an identification name of the IFA, the printer further configured to print a grid overlay atop the map file image having a plurality of marking areas corresponding to a plurality of respective coordinate locations on the map image file, a scanner configured to read the printed map image file having a mark in a marking area of the plurality of marking areas, the scanner further configured to read the barcode, and a network transmitter configured to connect to a network and transmit the barcode information and a coordinate location corresponding to the mark to a recording device, the recording device configured to record the information and the coordinate location to a database and associate the IFA to the information and the coordinate location in the database.

BRIEF DESCRIPTION OF THE SEVERAL VIEWS OF THE DRAWINGS

In the following description, the present invention is explained in more detail in relation to the enclosed drawings, in which.

DETAILED DESCRIPTION OF THE INVENTION

Figure 1:
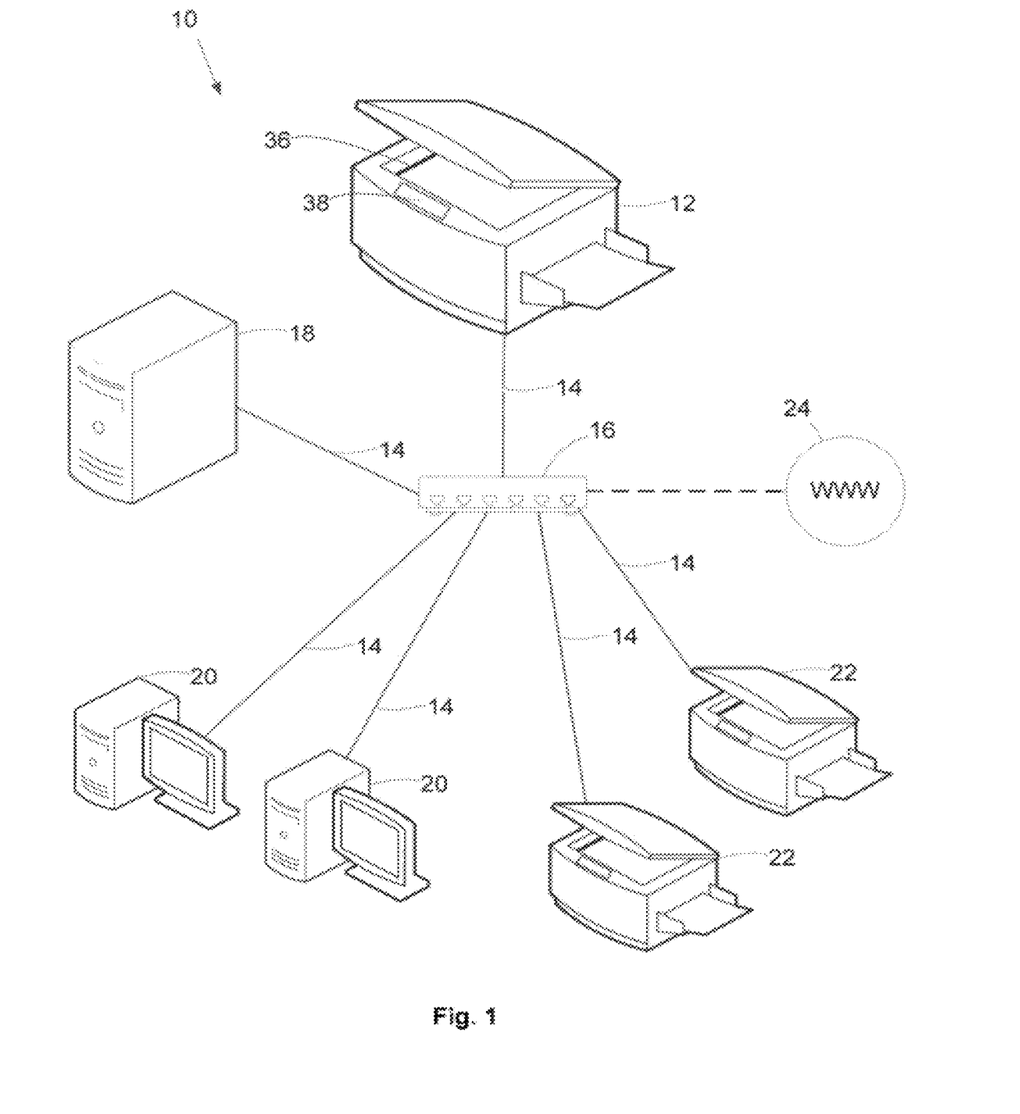
FIG. 1 depicts a network configuration including an image forming apparatus.

FIG. 1 depicts a network 10, which includes an image forming apparatus (IFA) 12 connected via a network connection 14 to a network hub 16. The IFA 12 includes a network controller, for example a TCP/IP controller for a 10/100/1000 Mbit/s Ethernet controller in accordance with the IEEE 802.3 LAN protocol. The IFA 12, in an alternative embodiment, includes a network controller in accordance with one of the wireless networking IEEE protocols 802.11b, 802.11g, and 802.11n. The network connection 14, in one embodiment, is a category five (Cat5 or Cat5e) cable in accordance with the IEEE 802.3 protocol although any type of communication protocol or medium can be used, including wired, wireless or optical, for example.

The network hub 16 is a network device configured to control and/or route communication information and data between the IFA 12, a management device 18, computer terminals 20 and additional image forming apparatuses 22. In a similar fashion to the IFA 12, the management device 18, the computer terminals 20, and the image forming apparatuses 22 are connected to the network hub 16 via network connections 14. In another embodiment, the network hub 16 is configured to connect to the World Wide Web or Internet 24, and controls and manages access to the Internet 24 from the IFA 12, the management device 18, the computer terminals 20, and the image forming apparatuses 22.

Figure 2:
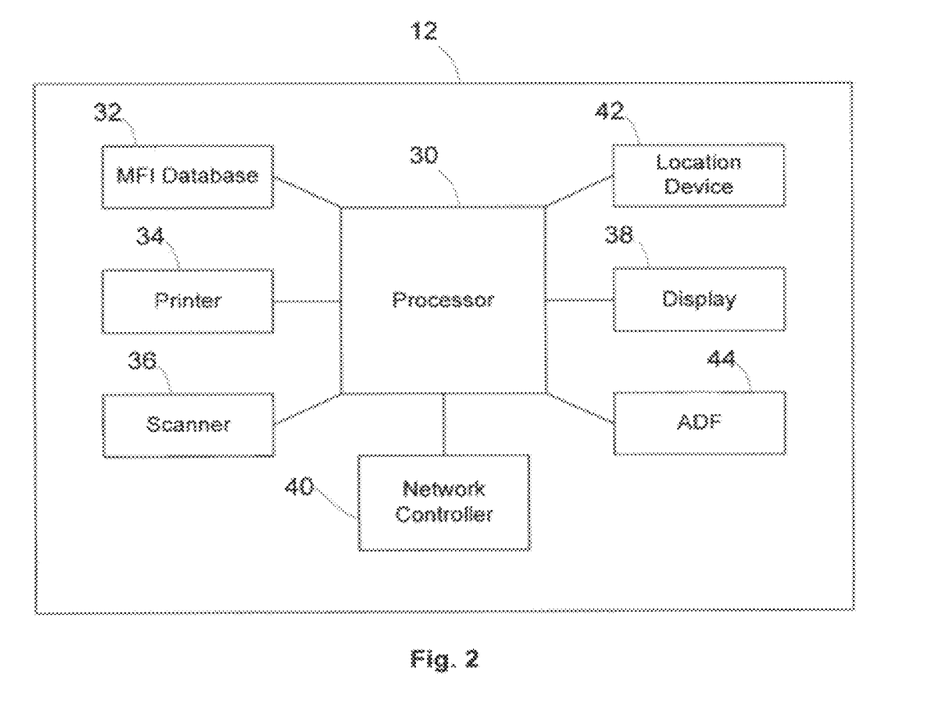
FIG. 2 depicts the image forming apparatus of FIG. 1 in greater detail.

FIG. 2 depicts the IFA 12 of FIG. 1 in more detail. The IFA 12 generally includes a processor or controller 30. The processor 30 is connected to various components of IFA 12, including a map file image (MFI) database 32, a printer 34, a scanner 36, a display 38 and a network controller 40.

The MFI database 32 is a computer readable medium, which has recorded thereon a plurality of map file images (MFIs) corresponding to floor plans or blueprint layouts of a regional location. A regional location includes a building, campus, building floor, and/or office spaces. For example, one MFI in the MFI database 32 is configured to depict a regional location corresponding to a floor plan of one level of a building. If that floor plan is extensive, then that one MFI is alternatively configured to depict only a portion of the floor plan and a second MFI is configured to depict the remainder. In even more extensive floor plans, a plurality of MFIs are configured to depict the entirety of the floor plan, where each of the MFIs depicts a portion of the floor plan.

In one embodiment, the MFI database 32 is categorized by at least one of geographical location (including country, state, city, address, building name, etc.) and building floor level. The MFI database alternatively stores coordinate or other data as an alternative on in addition to map file images.

Each MFI is preferably configured to depict at least general structures such as walls, desks, furniture, hallways, lighting, windows, entryways and exits of a regional location. If these general structures, for the entirety of the regional location, are printable on a single piece of paper of standard size (e.g., Letter or A4) such that the general office space structures are readily recognizable after printing, then only one MFI is necessary for depicting the regional location. Alternatively, if the regional location is extensive as discussed above, several MFIs are used so that the office space structures are readily recognizable after printing the MFI. In a further embodiment, the MFI is not printed, but is displayed as will be discussed in a further embodiment. In an embodiment where the MFI is displayed and not printed, a plurality of MFIs will be used to depict an extensive floor plan if a plurality of MFIs are used to adequately depict office structures at a given resolution of the display. Alternatively, if the MFI is displayed, the displaying structure will include a zoom feature to adequately depict office structures and a pan feature to pan between sections of the MFI. Here, one MFI is used for depicting an entire regional location.

The printer 34 is preferably a laser printer. In further embodiments, the printer 34 is an inkjet or bubble jet printer, although any printing technology can be utilized. The processor 30 is configured to query an MFI corresponding to a selected regional location from the MFI database 32 and print the MFI using the printer 34 in a process discussed in a further embodiment. Preferably, the printer 34 is configured to perform one of the additional functions of rasterizing, duplexing, stapling, collating, hole punching, and binding.

Figure 5:
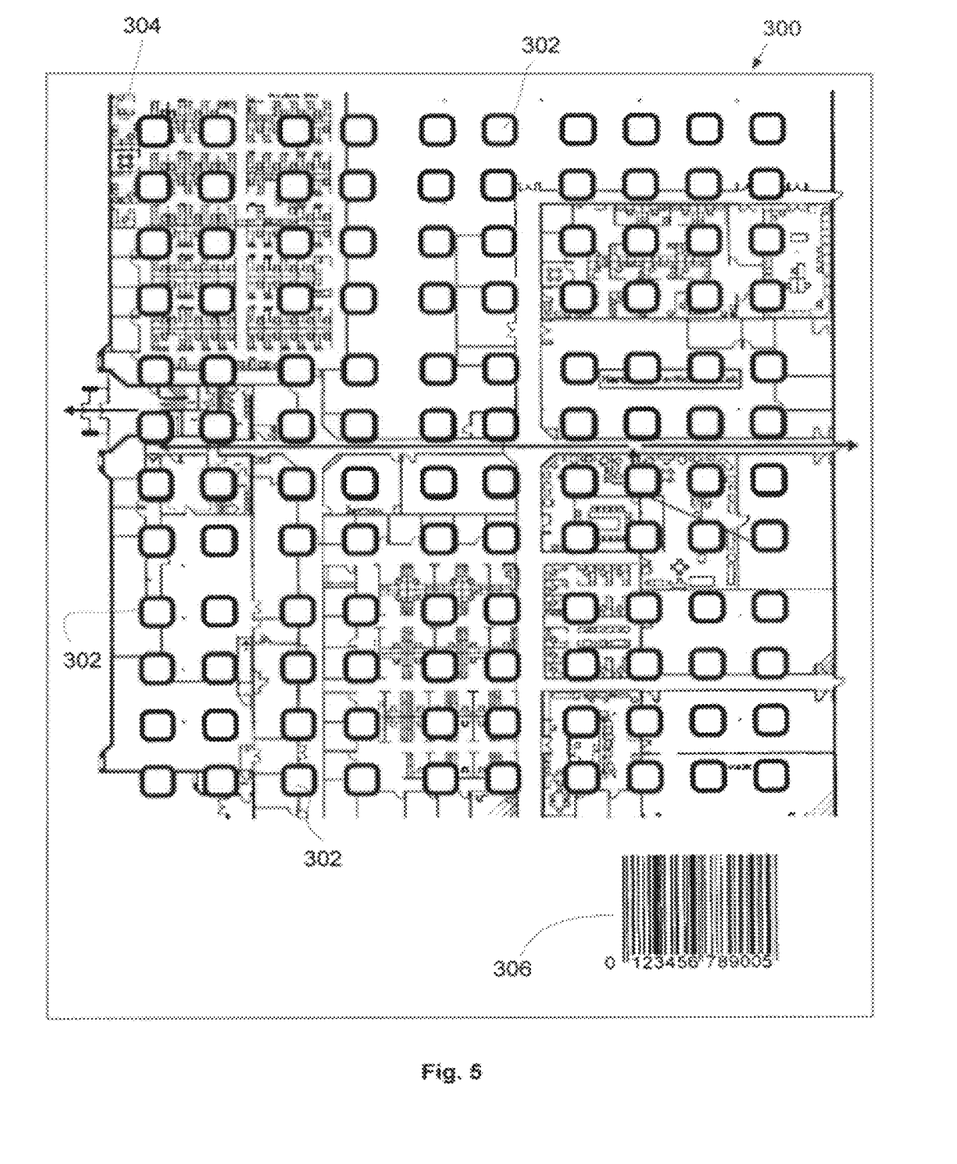
FIG. 5 is a map file image (MFI) and barcode printout in accordance with the process outlined in FIG. 3.

In one embodiment, the printer 34 is configured to print an overlay of marking areas atop the floor plan. An exemplary overlay is depicted in FIG. 5 and discussed below. The marking areas are preferably blank spaces, where one of the marking areas is marked for identifying a specific physical location of the IFA 12, although any type of marking area may be utilized.

In a preferred embodiment, the IFA 12 includes a scanner 36 connected to the processor 30. The scanner 36 is configured to scan documents, including the printed or marked MFI. In a further embodiment, the scanner 36 includes an optical character recognizer (OCR) configured to determine the marked marking area. The processor 30 uses the marked marking area to associate a coordinate location of the IFA 12 with respect to the regional location. For example, each regional location is associated with a coordinate grid such as an x-y coordinate system. In the simplest embodiment where a regional location is depicted by a single MFI, the single MFI will depict all of the possible x-y coordinates the IFA 12 may be located. In alternative embodiments, the entirety of the x-y coordinate is spread across a plurality of MFIs depicting the entire regional location in which the IFA 12 may be located. An x-y coordinate axis is preferable because it is easily recorded onto a computer readable medium into a database by the management device 18.

The IFA 12 also includes the display 38 connected to the processor 30, which is configured to display the contents of the MFI database 32, specifically each MFI associated with a selected regional location. As will be discussed below, the display 38 is also configured to select a specific MFI from the MFI database 32. The display 38, in a preferred embodiment, also includes controls for printing with the printer 34 and scanning with the scanner 36. Such controls include a touch-screen display where the touch-screen display is selectable across the viewing area. The display 38, in a further embodiment, includes access to configuring the network controller 40. The network controller 40 is primarily configured to control access to the network hub 16 via the network connection 14, as depicted in FIG. 1. Alternatively, the network controller 40 is a wireless network controller configured in accordance with one of the IEEE 802.11 protocols. In a further embodiment, the network controller 40 is configured for both wireless and wired network connections.

In other further embodiments, the IFA 12 includes a location device 42 connected to the processor 30. The location device 42 is a location detection device which uses at least one of radio frequency identification, wireless radio frequency triangulation, and satellite global positioning systems (GPS) to determine a coordinate-based location. In this embodiment, the processor 30 is configured to identify the coordinate-base location to a corresponding coordinate location of the regional location. Specifically, the processor 30 is configured to take, e.g., a GPS latitude/longitude coordinate from the location device 42 and associate it with an x-y coordinate on an MFI in the MFI database 32 corresponding to the regional location. For example, in an embodiment including GPS coordinate location identification, in a building having several regional locations placed atop one another such as a multiple level office building, selecting a regional location such as a floor and combining the regional location with the latitude/longitude coordinate location results in an accurate physical location identification of the IFA 12. Thus, GPS enabled IFAs are associated in the same fashion as non-GPS enabled IFAs in accordance with the methods discussed below.

Also, in a further embodiment, the IFA 12 includes an automatic document feeder 44 connected to the processor 30. The automatic document feeder 44 is configured to communicate and be controlled by the processor 30 and/or the display 38.

An IFA which capable of being configured in accordance with the above and used in accordance with the invention as discussed below is a RICOH® Aficio MP 7500, the manual for which is incorporated herein by reference. The Aficio MP 7500 includes an automated document feeder, a processor, a flatbed scanner, a paper tray, a touch-screen display, a network controller and a computer readable hard disc drive or solid state drive. The Aficio MP 7500 optionally includes a binder, a duplexer, a rasterizer, a stapler, a hole punch, an access terminal and a wireless network controller.

Methods of using an IFA having the aforementioned structures will now be discussed in more detail in accordance with claimed invention.

Figure 3:
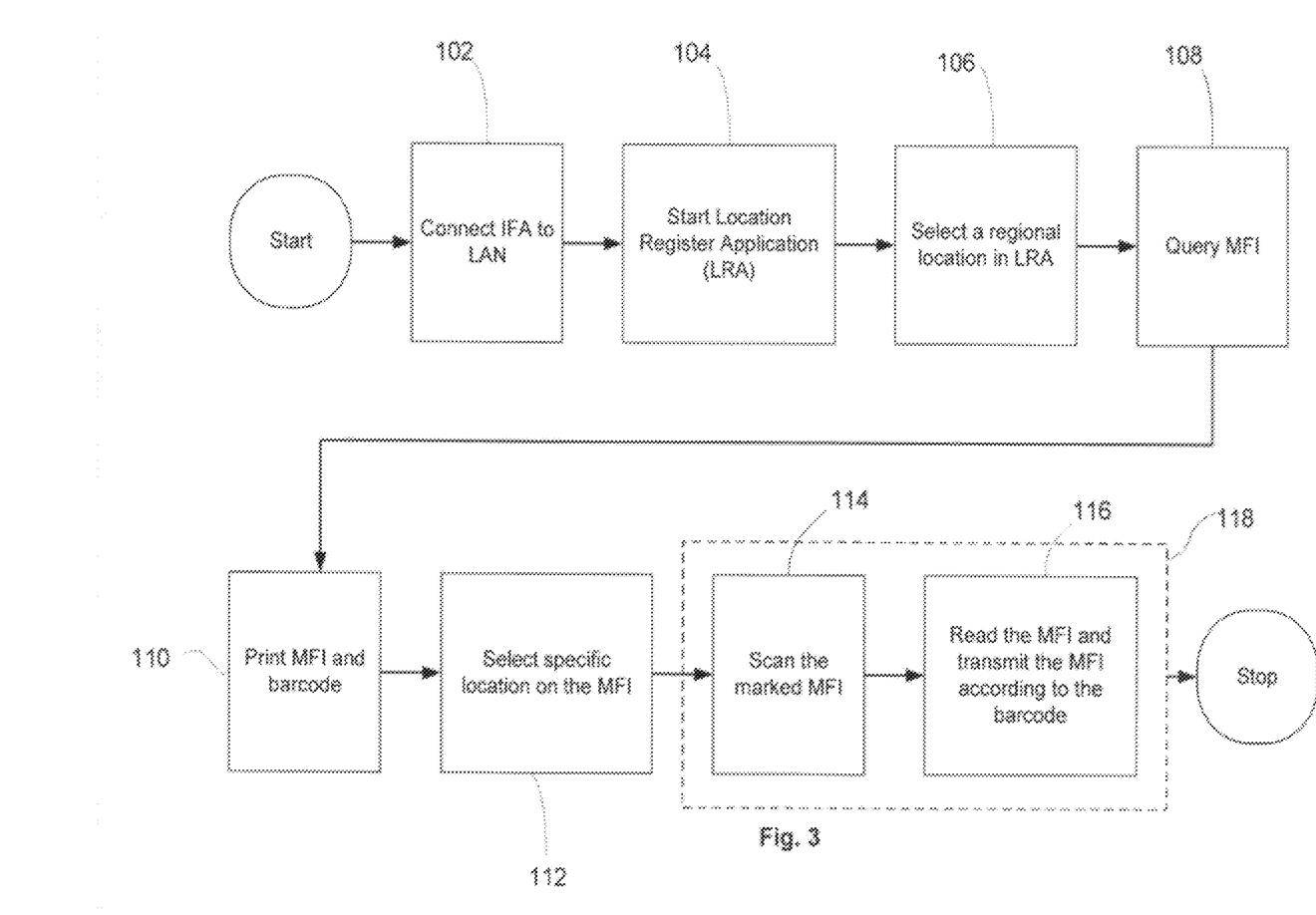
FIG. 3 is a flowchart of a location registration process.

FIG. 3 depicts a process by which an IFA is registered through a location register application (LRA). The LRA is controlled by the processor 30 of the IFA 12 and stored on a computer readable medium. At a first step 102, the IFA is connected to a network or a local area network, such as discussed above. Preferably, the IFA is connected to an intranet. Next, the LRA is started at step 104 and a regional location is selected in the location register application at step 106.

Figure 4:
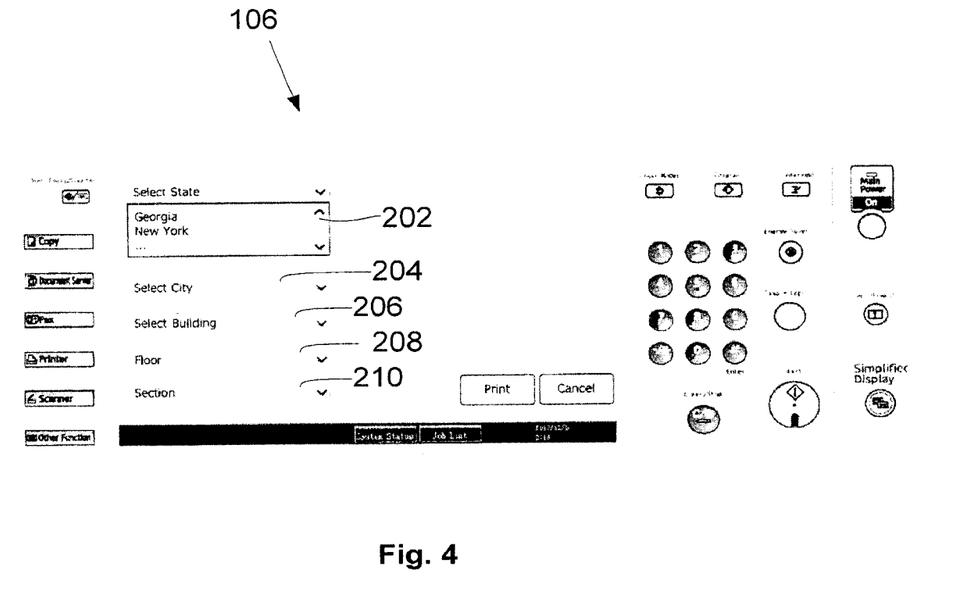
FIG. 4 depicts selecting a regional location in accordance with the process outlined in FIG. 3.

A regional location is selected at step 106 by using a graphical user interface as depicted in FIG. 4, for example by using the display 38 of the IFA 12. Such an interface is displayed using the display 38 attached to the IFA, or through a network interface as is discussed below in a further embodiment. Step 106 includes selecting a regional location using at least one of a state at field 202, a city at field 204, a building at field 206, a floor at field 208, or a section at field 210.

The specificity for the selected regional locations depicted in FIG. 4 is used to query an MFI at step 108 as outlined in FIG. 3. The MFI, as previously presented, is preferably a blue print type map of a floor of a building or a section of a floor of a building. Most preferably, the MFI is a bird's eye view of the layout of a floor with the MFI having identified therein office structures such as walls, offices, hallways, desks and doors. By querying the MFI, the processor 30 accesses the MFI database 32 and selects at least one MFI corresponding to a regional location, the regional location selected using the fields 202, 204, 206, 208 and 210. Since, as discussed above, there can be various MFIs corresponding to a single regional location, the step of querying an MFI at step 108 will include narrowing a search result using at least one of fields 202, 204, 206, 208 and 210. For example, a specific building is selected in field 206, resulting in displaying a plurality of MFIs corresponding to all of the regional locations within the specific building using display 38. A user then selects the specific MFI corresponding to the regional location or portion of the regional location corresponding to the location of the IFA 12.

After the MFI has been queried and selected at step 108, the MFI is printed at step 110 as outlined in FIG. 3. The printer 34 of the IFA 12 is used for printing, but the processor 30 is also configured to transmit the MFI to another printer such as a printer of one of IFAs 22. In addition to printing the MFI, the IFA is configured to also print a barcode 306 on a page 300, as depicted in FIG. 5, the page 300 including an MFI 304 and a plurality of marking areas 302. The barcode 306 is preferably a computer readable barcode including an identification name of the IFA, an internet protocol address of the IFA, properties related to functions the IFA is configured to perform, and a serial number of the IFA. Such functions the IFA is configured to perform include printing, scanning, duplexing, rasterizing, binding, stapling, punching, faxing, optical character recognizing, and image converting.

The computer readable barcode 306 is a one-dimensional barcode, as shown, or alternatively a two-dimensional barcode, not shown. A one-dimensional barcode is preferable if the barcode identifies merely an identification number of the IFA, such as a serial number or an IP address. For example, a one-dimensional or linear barcode in accordance with ISO/IEC 15417 is used. A two-dimensional barcode is preferable if the barcode has encoded thereon more than the serial number or IP address, and includes the functional capabilities of the IFA. For example, a two-dimensional barcode, or matrix barcode, in accordance with ISO/IEC 16022 is used.

The aforementioned information included on the barcode may be retrievable through an identification code correlating to or embedded in the barcode 306 and accessible through an intranet or internet database. Such an embodiment uses the network controller 40 to access the database and query the barcode in the database to retrieve information on the IFA. The database is preferably located in a computer readable medium of the management device 18, but is alternatively located on another computer readable medium accessible through the Internet 24.

This embodiment is preferable with a one-dimensional barcode where the barcode only includes a single number, such as a serial number or an IP address. Alternatively, information relating to the aforementioned properties of the IFA is embedded directly into the barcode 306 as a two-dimensional barcode as discussed above. As discussed above, the two-dimensional barcode is capable of including more information than a single number and it is thus not necessary to connect to a database to retrieve IFA information. However, the IFA can still be configured to retrieve information from a database using the two-dimensional barcode in the event the two-dimensional barcode is lacking information regarding a functional capability of the IFA.

As previously mentioned, the IFA is preferably configured to print a grid overlay of marking areas 302 atop the MFI 304. Each of these marking areas corresponds to a coordinate location on the MFI 304, which in turn corresponds to a physical location of the regional location the MFI 304 depicts. As previously discussed, the coordinate location is an x-y coordinate location. As portrayed in FIG. 5, the MFI 304 depicts a portion of a floor of an office using a blueprint or floor plan-type map, where each of the marking areas 302 corresponds to an x-y coordinate location.

Each of the marking areas 302 is a substantially square box having a blank interior. Alternative, the marking areas are circles having a blank interior.

After the page 300 has been printed at step 110 outlined in FIG. 3, a specific location on the map image file is selected at step 112. In this embodiment, a mark is made to one of the marking areas 302, the mark and corresponding selecting marking area 302 is selected based on a corresponding physical or specific location of the IFA. For example, a user correlates the physical surroundings of the IFA 12 to office structures depicted in the MFI 304 and places an "X" or other mark in one of the marking areas 302, including shading the entirety of the marking area 302. After the specific location has been selected and marked on the MFI 304, the MFI 304 is then scanned at step 114 using, as previously discussed, the scanner 36 of the IFA 12.

The scanned MFI is then read by a computer or the OCR of the IFA 12, and the location information, specifically the x-y coordinate location corresponding to the marked marking area 302 is transmitted to a recording device using the processor 30 and network controller 40 of the IFA 12. The recording device is preferably a hard drive, such as a magnetic rotating disks, a flash-based solid state drive, or any other type of storage medium connected to the management device 18 connected to the IFA 12 via network controller 16.

The management device 18, and thus the recording device, is configured to record the location information, as well as any information included in the barcode 306 in a database and associate the information with the IFA in the database. Specifically, the management device creates a database of IFAs connected to the network controller 16, identifying each IFA by an identification name or IP address and stores the database on the recording device. Associated with each IFA (by means of the identification name or IP address), the database includes fields for the management device 18 to record at least the x-y coordinate location of the IFA, but also preferably includes fields for recording the functional capabilities of the IFA (such as duplexing, scanning, rasterizing, binding, faxing, etc.).

Alternatively, the information, including the x-y coordinate location and identifying information included in the barcode, is transmitted in accordance with instructions embedded in the barcode. This embodiment is preferably used with a two-dimensional barcode configured to include computer readable code to instruct the processor 30 of the IFA 12 to transmit the information via network controller 40. For example, the LRA is configured to print an instruction into the barcode 306 which instructs the processor 30 to transmit the location information to one of a plurality of recording devices or to a specific internet protocol address via network controller 16 connected to the Internet 24.

Figure 6:
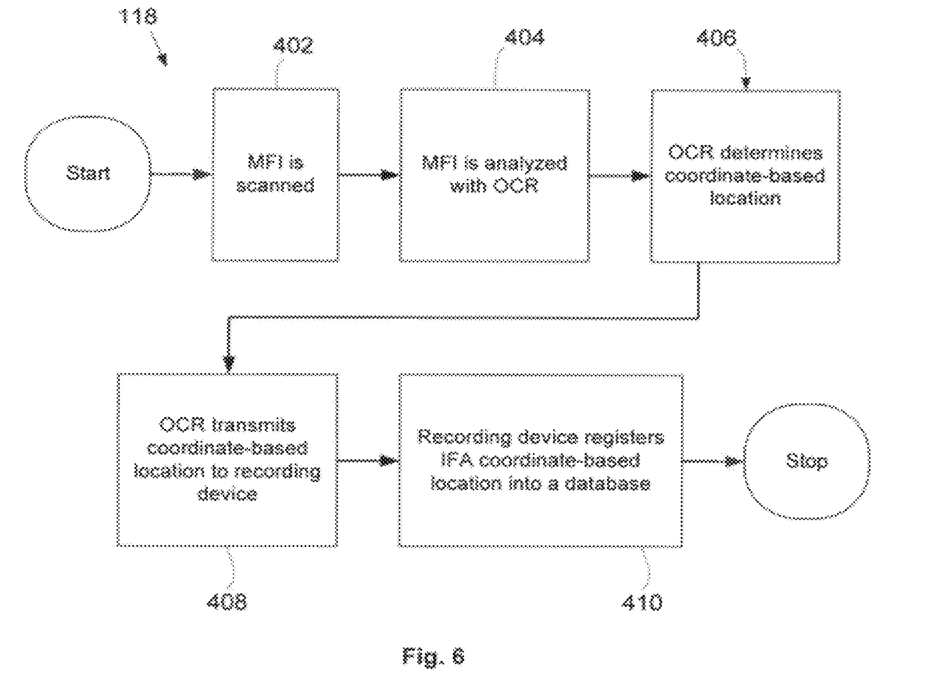
FIG. 6 is a flowchart depicting scanning the marked MFI in accordance with process outlined in FIG. 3.

In another embodiment, steps 114 and 116 outlined in FIG. 3 are performed together as step 118 as outlined in FIG. 6. FIG. 6 depicts a step of scanning the MFI at step 402, where the MFI is then analyzed at step 404 with the OCR as previously mentioned. The OCR determines, at step 406, the coordinate based x-y location of the marked marking area 302 on the MFI 304 by comparing the marked and scanned MFI with an unmarked MFI, specifically the MFI queried at step 108 prior to printing at step 110. This MFI is a digital image and is compared to a digital image of the scanned and marked MFI. The processor 30 of the IFA 12, or alternatively the management device 18 if the scanned and marked MFI is transmitted prior to comparing, compares the two digital images to determine the marked area and associates an x-y coordinate location based on the marked area.

The OCR then transmits the coordinate based location to a recording device at step 408, or alternatively to the management device 18 to be recorded in a database as previously discussed. The recording device then registers the IFA at step 410 by recording the coordinate location into the database and associating the coordinate location to an identification name or IP address of the IFA as mentioned above. The recording device also records any, if not all, of the information included in the barcode. This includes an internet protocol address, functions the IFA is configured to perform, a device name or identification name of the IFA and a serial number of the device as mentioned above.

Figure 7:
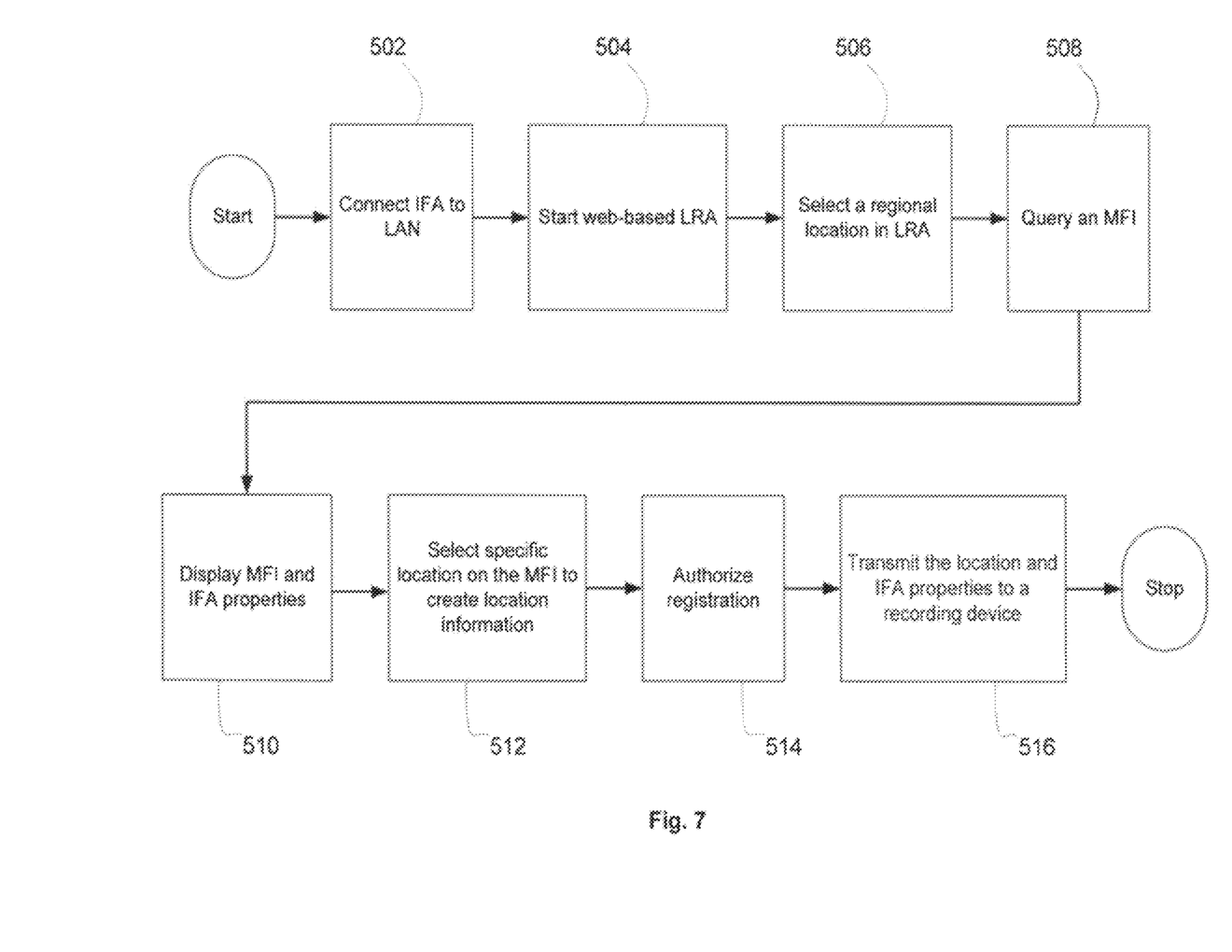
FIG. 7 is another embodiment of a location registration process.

FIG. 7 outlines another embodiment, which incorporates web or network-based access to the IFA 12. FIG. 7 outlines the IFA 12 connected through a network, Internet, intranet or LAN connection at step 502 where the IFA is assigned a network address or more preferably, an internet protocol (IP) address. At step 504, a web or network based location register application (LRA) is initiated. Starting the LRA is performed by entering, for example, the IP address of the IFA assigned at step 502 in an IP browser of a computer terminal. For example, an internet browser provides an html or Java-based graphical user interface to the IFA 12, similar to the display 38 presented in the previous embodiments.

Figure 8:
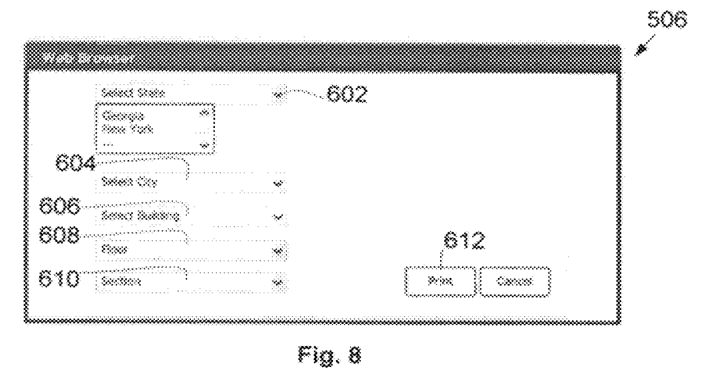
FIG. 8 depicts a network-based selecting of a regional location in accordance with the process outlined in FIG. 7.

Next, a regional location is selected in the LRA at step 506. FIG. 8 depicts a screen shot selecting a regional location in accordance with step 506, where a state is selected at field 602, a city is selected at field 604, a building is selected at field 606, a floor is selected at field 608 and a section of a floor is selected at field 610. Adverting back to FIG. 7, an MFI is queried at step 508 using the regional selections made at step 506 using at least one of fields 602, 604, 606, 608 and 610. As with the previous embodiments, the queried and selected MFI is preferably one of a plurality of MFIs corresponding to various regional locations corresponding to the selected fields 602, 604, 606, 608 and 610.

Figure 9:
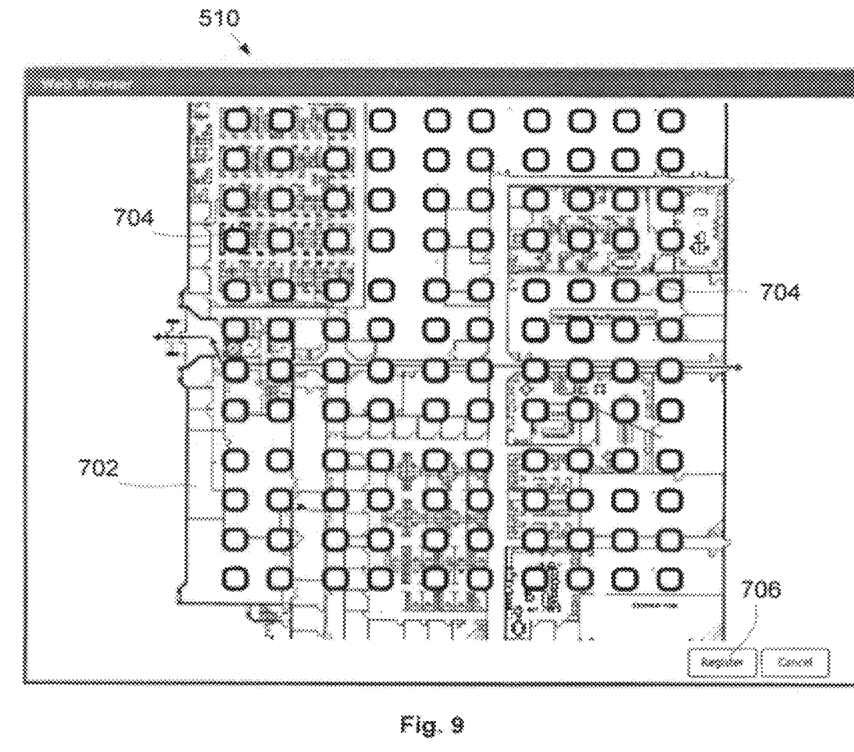
FIG. 9 is a screen shot of displaying an MFI in accordance with the process outlined in FIG. 7.

The MFI is then displayed at step 510, wherein the displayed MFI corresponds to the regional selections made at step 506. For displaying, a print button at field 612 in FIG. 8 is selected, which includes printing a barcode and an overlay of marking areas in accordance with the previous embodiment and FIG. 5. Alternatively, and preferably with web-based access to the IFA 12 and in reference to FIG. 9, a print button at field 612, once selected, initiates step 510 in FIG. 7 and creates a virtual display of an MFI 702. Here, the MFI 702 is an electronic MFI displayed in a web browser, having thereon a plurality of marking areas 704. A specific location on the MFI is selected at step 512 to create location information. Specifically, one of marking areas 704 of FIG. 9 is selected.

Then registration is authorized at step 514 by selecting the registration button at field 706, which starts the transmitting step 516 where the LRA transmits the location information of the IFA to the recording device, namely the management device 18 via the network controller 40 of the IFA 12. The step 514 preferably includes associating the selected marking area 704 with an x-y coordinate location, where the x-y coordinates are including in the location information for the IFA transmitted at step 516. In addition, the LRA transmits IFA properties to the recording device, including IP address, identification name, functions the IFA is configured to perform, and IFA serial number as previously discussed.

Therefore, an IFA is registered and its location managed using one of the above-discussed embodiments. As for tracking an IFA after the IFA has been registered, FIG. 10 outlines a process of accessing the recording device through the network to display a MFI corresponding to the regional location of a selected IFA. At step 802, a recording device is accessed through the network. For example, a computer terminal 20 accesses the management device 18 using the network controller 16. Then, the computer terminal 20 transmits search terms and commands, such as a parameterized search to the management device 18 at step 804. The management device 18 preferably includes an MFI database similar or identical to the MFI database included in the IFA 12. Alternatively, the management device 18 is configured to access the MFI database 32 of the IFA 12 using the network controller 16.

Figure 10:
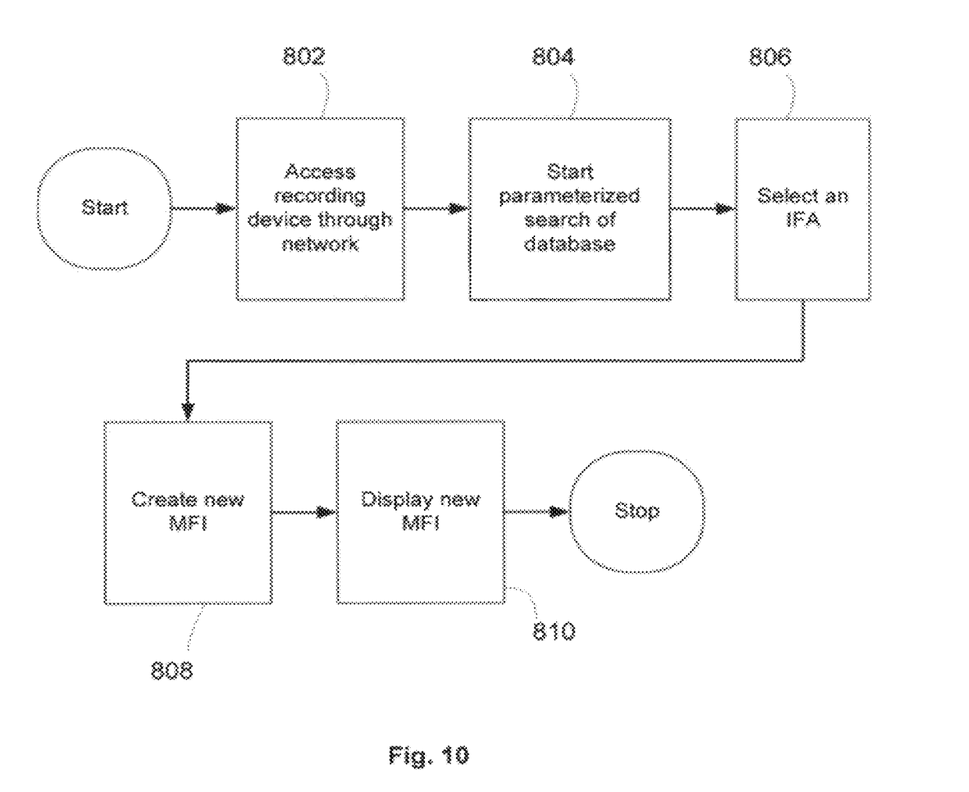
FIG. 10 is a flowchart of searching a recording device for an image forming apparatus having its location registered in accordance with the process outlined in either FIG. 3 or FIG. 7.

The parameterized search is preferably based on a number of parameters including device identification name, functions the IFA is configured to perform, IP address, or regional location. Additionally, a specific MFI or latitude/longitude coordinate and radius requirement is included as parameters. For example, a parameterized search includes searching IFAs configured to staple and duplex within a specific regional location. Here, at step 804, the computer terminal 20 transmits the parameters staple, duplex, and regional location to the management device 18 where the management device 18 queries a database recorded on a computer readable medium of the management device 18 and returns to the computer terminal 20 a list of IFAs which meet the parameters.

At step 806, a specific IFA of the aforementioned list is selected, but it should be appreciated the parameterized search, depending on the parameters chosen, will return no IFAs, one IFA, or a plurality of IFAs. In the event the management device does return a list of a plurality of IFAs, one or more the IFAs are selected at step 806.

The selected IFA(s) are then identified on a newly generated MFI using an existing MFI of the MFI database. The newly generated MFI, created at step 808, uses symbols or numbers to identify each of the selected IFA(s) using the associated x-y coordinate locations of the respective IFA wherein the symbols or numbers are overlaid onto an existing MFI of the MFI database.

Then, at step 810, the newly generated MFI is displayed, which includes printing the newly generated MFI using any of the IFAs 22 or IFA 12, displaying the newly generated MFI in a web browser or creating an image document to be saved in a computer readable medium on the computer terminal 20 or the management device 18.

The invention claimed is:

1. A method, comprising:
   connecting an image forming apparatus (IFA) to a network to assign the IFA a network address;
   selecting a map file image from a plurality of map file images, the selected map file image corresponding to a regional location of the IFA;
   outputting the selected map file image by printing the selected map file image, the printing including printing a computer readable barcode onto the map image file, the barcode corresponding to information including at least the network address of the IFA;
   selecting a location on the map file image which corresponds to a physical location of the IFA by marking the printed map file image with a mark corresponding to the physical location of the IFA;
   scanning the marked printed map file image, the scanning including reading the barcode;
   comparing the scanned map file image with the selected map file image to determine a coordinate location of the mark;
   identifying the network address of the IFA as a result of the reading of the barcode; and
   storing the coordinate location of the mark resulting from the comparing as a location of the IFA together with the network address of the IFA identified from the barcode.

2. The method recited in claim 1, the barcode further corresponding to information including at least one of a function the IFA is configured to perform and an identification name of the IFA.

3. The method recited in claim 1, wherein
   the barcode includes an instruction and the scanning includes reading the barcode for the instruction and the information corresponding to the barcode,
   the storing includes transmitting the location, the network address, and the information to the recording device according to the instruction, recording the information in a database entry, and associating the information with the IFA.

4. The method recited in claim 1, wherein the printing the selected map file image includes printing an overlay of a grid on the selected map file image, the grid having a plurality of marking areas corresponding to a plurality of respective coordinate locations on the map image file, wherein the marking the printed map image file includes marking one of the plurality of marking areas and the coordinate location of the mark is one of the plurality of respective coordinate locations.

5. The method according to claim 4, wherein the marking areas are periodically spaced blank areas which overlay atop the printed map file image.

6. The method recited in claim 1, wherein the regional location is at least one of a country, state, city, zip code, address, building, floor and campus.

7. The method recited in claim 1, wherein the storing includes storing the location and the network address in a database of a recording device, further comprising:

accessing the recording device through the network;

searching the database for a database entry corresponding to the IFA using a search term including at least one of the network address of the IFA, a function the IFA is configured to perform, and an identification name of the IFA; and outputting a search result by creating a new map image file by overlaying the location of the IFA onto the selected map image file and displaying the new map image file.

8. An image forming apparatus (IFA), comprising:

a processor configured to query a map file image of a plurality of map file images, the map file image corresponding to a regional location of the IFA;

a printer configured to print the map file image and a computer readable barcode, the barcode configured to include information about the IFA, including at least a network address of the IFA, the printer further configured to print a grid overlay atop the map file image having a plurality of marking areas corresponding to a plurality of respective coordinate locations on the map image file;

a scanner configured to read the printed map image file having a mark in a marking area of the plurality of marking areas to determine a coordinate location of the mark, the scanner further configured to read the barcode to identify the network address of the IFA therefrom; and a network transmitter configured to connect to a network and transmit the barcode information, including the network address of the IFA, and a coordinate location corresponding to the mark to a recording device to associate the IFA to the barcode information, including the network address of the IFA, and the coordinate location in a database.

9. The IFA according to claim 8, wherein the marking areas are periodically spaced blank areas which overlay atop the printed map file image.

10. A tangible computer readable medium storing computer-executable instructions, which when executed by a computer, cause the computer to execute a process, the process comprising:

outputting a selected map file image, which was selected from a plurality of map file images to correspond to a regional location of the IFA, by printing the selected map file image, the printing including printing a computer readable barcode onto the map image file, the barcode corresponding to information including at least a network address of the IFA which was acquired by the IFA upon connection to a network;

comparing a scan of the printed map file image, after the printed map file image has been marked by a mark so as to indicate a physical location of the IFA on the printed map file image, with the selected map file image to determine a coordinate location of the mark;

obtaining the network address of the IFA by reading the barcode from the scan of the printed map file image; and storing the coordinate location of the mark resulting from the comparing as a location of the IFA together with the network address of the IFA obtained by reading the barcode.

11. The computer readable medium according to claim 10, wherein:

the printing the selected map file image includes printing an overlay of a grid on the selected map file image, the grid having a plurality of marking areas corresponding to a plurality of respective coordinate locations on the map image file, and the mark is in one of the plurality of marking areas and the coordinate location of the mark is one of the plurality of respective coordinate locations.

12. The computer readable medium according to claim 11, wherein the marking areas are periodically spaced blank areas which overlay atop the printed map file image.

* * * * *